Patented Jan. 17, 1939

2,144,101

UNITED STATES PATENT OFFICE 2,144,101

POLYHYDRIC ALCOHOL RESINS

William H. Butler, Palisades Park, N. J., assignor to Bakelite Corporation, New York, N. Y., a corporation of Delaware No Drawing. Application October 9, 1935,
Serial No. 44,271

10 Claims. (Cl. 260—4).

This invention relates to synthetic resinous products that find application more particularly in the preparation of coating compositions, to processes for producing them and to compositions made from them.

It has long been known that polyhydric alcohols when reacted with polybasic acids give useful resinous products known as alkyd resins. These resins and their properties were described by J. Watson Smith in 1901, and numerous patents have since been granted on resins of this class, their preparation and their applications. In the coating field, however, alkyd resins have not found extended utility, and reasons for this are to be found in their low melting points and lack of waterproofness or resistance to moisture; likewise their lack of compatibility with fatty oils have excluded them from the field of drying oil coating compositions. In order to improve them for use in coating compositions, it has become the practice of substituting in part for the polybasic acid a monobasic acid, such as a fatty acid, the resulting products accordingly being mixtures of the esters of the polybasic and the monobasic acids; but even when so modified the resinous products still remain deficient in the respects indicated.

In contrast with the class of alkyd resins that are prepared from polyhydric alcohols there is the well-known phenolic type of resin made from phenol or an alkyl or aryl substituted phenol and formaldehyde or equivalent and characterized by heat-hardening and a marked superiority in resistance to water and common solvents; and when the phenolic resin is further characterized by solubility or compatibility with fatty or drying oils without an added solubilizing agent (made commercially available in recent years), the resulting composition with a fatty oil exhibits a marked acceleration in drying together with a greatly increased resistance to the action of water and alkalies in the deposited film. The phenolic resin type, including the oil-soluble, however, has so far remained inferior to the polyhydric alcohol type in freedom from color and resistance to the action of light.

It is obvious that if the desirable properties of freedom from color and stability of color characterizing the polyhydric alcohol can be combined with those of the phenol resin, the resulting product has value and importance in the various fields utilizing resins. Attempts have accordingly been made in the past to secure such combinations of desirable properties by various admixtures of the two types of resins. The present invention differs therefrom in that it is based on the discovery that desirable properties of the polyhydric alcohol type of resin can be combined with those of the phenolic type through the formation of resinous compounds instead of resinous mixtures. This is accomplished by employing as an acid a carboxylic acid which likewise has the properties of a phenol, (as salicylic acid) causing the reaction of such an acid with an aldehyde (formaldehyde) or its equivalent in proportions to obtain phenol resin characteristics, then reacting the resin so formed with a polyhydric alcohol (glycerol) to yield a compound thereby embodying in addition the polyhydric alcohol resin characteristics. By following this procedure it has been found that the phenol resin characteristics are retained (such as waterproofness, resistance to solvents, etc.), while the product has imparted to it as well the absence of color, resistance to light and toughness of the polyhydric alcohol resin. They are also characterized by the property of reacting with further amounts of methylene-containing agents, if not sufficiently heat-reactive, and thereby hardening under the action of heat with a rapidity such that they can be used in place of phenol resins in the production of light colored molded articles, laminated materials, etc.

The utility of these resins, prepared by the reaction of polyhydric alcohols with the reaction products of phenol-carboxylic acids and formaldehyde or the like, is particularly marked in the preparation of drying oil coating compositions. They can be made so as to be compatible with a drying oil in any proportion and therefore available for the preparation of both short-oil and long-oil compositions; solubility or compatibility with fatty or drying oils is promoted by including a modifying agent such as rosin or other natural resin, drying or non-drying fatty oil, fatty oil acid, etc. When so modified they are especially valuble when cooked with tung oil, for instance in producing very pale and non-yellowing quick drying varnishes, white enamels, etc.

An unexpected result associated with resins prepared in accordance with this invention, when modified to impart oil-solubility or compatibility, is the acceleration effect on drying when incorporated in vehicles containing relatively large proportions of linseed oil, i. e. long-oil varnishes. Long-oil varnishes prepared from linseed oil possess certain characteristics which recommend them to varnish manufacturers; for instance enamels prepared from them by adding pigments have the advantages of easy brushing and good leveling even when the pigment ratio is high, freedom from skinning on storage and retension of flexibility on aging. An objection to such varnishes, however, is the long drying time required. Inclusion of resins of this invention, however, make possible the production of vehicles containing 50–75 per cent linseed oil which have the brushing and leveling characteristics of the long-oil varnishes but dry rapidly; it has been found possible, for instance, to cut the drying time to about one quarter of that formerly deemed necessary while at the same time permitting the use of considerably less quantities (i. e. 50% or less) of drier than ordinarily included. In addition varnishes employing the resins of this invention even in small amounts are free from livering, possess desirable pigment wetting and high gloss characteristics and are far more durable than the vehicles formerly used for this purpose. Furthermore the durability of the oil film is greatly enhanced even though the amount of resin included is but a few percent (one per cent or more) of the total vehicle; and the alkali and soap resistance is greatly improved.

Resin of this type likewise can be made compatible with cellulose ester lacquers to give coating compositions which dry to hard, water-, alkali,- and alcohol-resistant coatings which are in many respects equal to coatings obtained by the use of so-called spar or marine varnishes. In general these resins are pale in color and of excellent light stability.

For a more complete understanding of the present invention examples are herewith submitted. It is to be understood, however, that they are illustrative merely.

*Example 1.*—A resin is prepared from a phenol-carboxylic acid by reacting together 100 parts by weight of salicylic acid (or hydroxy benzoic acid) with 100 parts of formalin (37% aqueous solution of formaldehyde) in the presence of 1 part of oxalic acid at atmospheric pressure for a period of about 10–12 hours; other weak or dilute acid, particularly organic, or alkaline catalysts can be substituted for oxalic acid, or the catalyst may be omitted entirely particularly if higher pressures are used. The acid resin so obtained is dehydrated by heating to about 120° C.; or it can be dehydrated by other means, such as applying a vacuum at lower temperatures.

In the foregoing example equivalent weights of other phenol-carboxylic acids can be substituted or used in admixture, such as the meta and para hydroxy-benzoic acids; the aryl or alkyl substituted homologs of hydroxy-benzoic acid as the ortho, meta and para cresotinic acids, etc; acids containing more than one hydroxyl group, as dihydroxy benzoic acid, gallic acid, etc.; hydroxy acids with more than one carboxyl group, as hydroxy phthalic acid, etc.; acids containing condensed nuclei, as hydroxy naphthoic acids, etc. Such a phenol-carboxylic acid is reacted with formaldehyde (or equivalent methylene-containing or substituted methylene-containing agent as paraform, hexamethylene-tetramine, acetaldehyde, or when color is not material furfural, acetone, etc.; preferably in proportions to give a reactive type of resin or one that hardens under the action of heat; in general this proportion is about one to one and one-quarter mols or more of aldehyde to each mol of phenol acid.

The time of the initial condensation can be decreased or increased to correspondingly vary the degree of heat-reactivity desired in the final product. As the reaction time is extended the product is also made harder and more brittle and its softening point is elevated.

The dehydrated resin is thereupon reacted with a polyhydric alcohol and this can be accomplished for instance by any of the following procedures:

*Example 1a.*—100 parts of the acid resin are reacted with 18 parts of glycerin by heating to a temperature of 170–200° C. for a period of about three and one-quarter hours at atmospheric pressure. Under the specific conditions herein set out the acid number of the resin is reduced from 340 to 200 or less. The product is potentially reactive or heat-hardening in that on continued heating it becomes infusible and insoluble; the hardening of the product can be accelerated by the addition of an aldehyde. Where resins of the fusible or nonhardening type are produced by proper control of proportions and reaction conditions, they can be made heat-hardening after esterification by the addition of aldehydes.

Other polyhydric alcohols can be used to replace glycerol in this and following examples and in whole or in part such as polyglycerol, glycol, ethylene glycol, pentaerythritol, etc. The amounts used can be greater or less than that required for complete esterification. Esterification is also controlled by the temperature and the time of the reaction.

The final product can be included with cellulose esters to give lacquers of improved durability and resistance to acids, alkalies and moisture. They can also be included in China-wood oil and other fatty oils, particularly if natural or synthetic resins of oil-soluble character are incorporated as solubilizing agents.

*Example 1b.*—20 parts of the dehydrated acid resin is reacted with 80 parts of technical abietic acid and 12 parts of glycerine. This is accomplished by first dissolving the resin in the abietic acid by heating the mixture to 200° C., and thereupon glycerine is added and the temperature gradually raised over a period of about 5 hours to a temperature of about 270° C. The product is held at this temperature for about 2 hours or until the acid number is reduced to 10 or 15. The resin obtained is transparent, pale amber in color, hard and brittle, softens at about 125° C., is soluble in hydrocarbons and drying oils and is compatible with cellulose derivatives.

By varying the foregoing treatment it is possible to obtain products ranging in softening point from very soft resins to products that are infusible. For instance the hardness or fusibility can be controlled, in addition to the amount of formaldehyde used in the initial reaction and the time of the initial reaction, by varying the proportion of the initial reaction product and the abietic acid; lower and higher ratios than one of acid resin to modifying agent give useful products. In place of abietic acid other resin acids, rosin, copal or other natural resins can be substituted, to act as modifying agents.

*Example 1c.*—80 parts of the initial resinous condensation product is heated with 20 parts of phthalic anhydride to about 200° C. Thereupon about 32 parts of glycerine are then added and the mixture heated for about ¾ of an hour at 200° C. On further heating the product is converted to the infusible insoluble condition.

By change in the proportions initial condensation products can be obtained which are fusible, and the resinous product prepared by the further addition of phthalic anhydride and glycerine can be hardened with aldehyde. The hardness is also controlled by the extent of esterification with the glycerol. In place of phthalic anhydride other polybasic acids can be used such as maleic, succinic, etc. The final products are useful in the production of pale colored articles and molded compounds.

*Example 1d.*—100 parts of the initial resinous condensation product is mixed with about 50 parts of castor oil and 12 parts of glycerine. The mixture is held at 200 to 220° C. for a period of about 2 hours or until the acid number is reduced to 25 or less. The final products are pale, soluble in hydrocarbons and drying oils and compatible with nitrocellulose esters. They improve the general durability of coating compositions and their resistance to alkalies, acids and moisture.

The process can be varied by including the fatty acid or glycerine of the fatty acid in the initial condensation, and the mixed acid resin thus produced can then be reacted with glycerine. For instance castor oil is included at the beginning with salicylic acid and formalin, heated and then dehydrated, following the proportions and conditions stated. Or the castor oil can be added after the initial reaction has proceeded for about 10 hours, and the heating then continued for another 2 hours.

Another variation of the process here outlined is the further addition of castor oil to a dehydrated initial product made with castor oil added at the beginning. For instance to a product, prepared from 100 parts of salicylic acid, 100 parts of formaldehyde and 50 parts of castor oil, is added 33 parts of castor oil, 33 parts of rosin and 10 parts of glycerine and the mixture reacted at 200–220° C. for approximately 3–6 hours or until the acid number falls to 20–25. The resin so made resembles honey in color, is soft, fusible, soluble in hydrocarbons and fatty oils and compatible with cellulose derivatives. Cellulose ester coating compositions containing this resin as a major component have high moisture resistance, especially to salt water, and do not become brittle; for example a lacquer of 2–3 parts of the resin to 1 part dry cellulose ester and suitable solvents deposits a film retaining its integrity from 4 to 6 months or longer in a tide range where it is twice daily subjected to complete immersion in salt water.

In any of the above variations castor oil can be substituted in whole or in part by its fatty acids, fatty acids derived from linseed oil, tung oil, cottonseed oil, cocoanut oil, soya bean oil, etc., or the oils themselves or glycerides of other fatty acids. For instance, 50 parts of fatty acid derived from linseed oil is substituted and 15 parts of glycerine added to esterify; such a product is somewhat darker but otherwise compares with those of the preceding examples. Or the proportions of linseed oil fatty acid and glycerine included can be increased to 100 parts of fatty acid to 100 parts of resin, heated to about 200° C., mixed with about 33 parts of glycerine and maintained for 45 minutes or until the acid number is less than 50; a solution of this product in xylol can be sprayed or brushed and baked to a hard glossy coating highly resistant to alkali. When tung oil is substituted (100 parts oil to 100 parts resin), dehydrated at about 130° C. and heated with 14 parts glycerine at 200–220° C. for 2–3 hours or until the acid number is 25 or less, a material of similar properties is obtained.

The oils or fatty acids can furthermore be substituted by blown or polymerized oils or by dibutyl phthalate, tricresyl phosphate, acetanilid, toluene-sulfonamide, ethyl phthalyl or methyl phthalyl glycollate and the like. Or these can be added as softening agents to regulate the hardness of the resin. Such plasticizers can be added during or after the initial condensation or esterification.

*Example 2.*—A resin found particularly suitable for use in linseed oil vehicles and having a marked accelerating effect thereon is prepared by mixing 100 parts para-hydroxy-benzoic acid, 100 parts of formalin, 1 part of oxalic acid and refluxing for about 12 hours. To this is added 200 parts of rosin and heating continued for about 2 hours. The product is dehydrated at 150° C. There is then added 200 parts of rosin and 60 parts of glycerine and heat is applied at 250° C. for about 8 hours or until the acid number is less than 20. The resin is light in color, hard, brittle, softens at 280–300° F., and is soluble in fatty oils and varnish solvents.

Vehicles containing this resin, made from a para substituted phenol acid, give light-colored quick-drying enamels of exceedingly high durability, excellent brushing and leveling properties, freedom from skinning on storage and retention of flexibility on aging. The properties of high linseed long-oil varnishes are particularly outstanding; for example, a varnish of 50–75 gallon oil length, i. e. 100 pounds of resin to 395–590 pounds of oil (60–70% linseed oil and 30–40% tung oil), dries in about 2½ hours as compared with 6–12 hours drying time for a usual natural resin- or rosin-treated phenol resin varnish; the deposited film has excellent water and alkali resistance. For furniture coating, a varnish of 100 pounds of resin to 75–100 pounds tung oil dries very rapidly and permits early rubbing and finishing to a hard alkali and alcohol resistant coating.

*Example 3.*—The use of alkaline catalysts in the preparation of these resins is illustrated by mixing 100 parts salicylic acid, 75 parts formalin and 2 parts of lime, and refluxing for about 12 hours. The potentially heat-reactive resin is viscous and is partially dehydrated at 90° C. With this is mixed 800 parts of rosin and 116 parts of glycerine, and the mixture heated at 260–270° C. for about 5–6 hours or until the acid number is about 10. The product of amber color softens at about 110° C. and is readily soluble in tung oil.

*Example 4.*—The initial reaction can be accelerated by use of pressure. For instance, 100 parts of salicylic acid, 75 parts formalin and 1 part oxalic acid are reacted for 45 minutes at 130–132° C. under a pressure of 40–60 pounds per square inch, and then dehydrated at 140° C. This is then mixed and heated with rosin and glycerine as in the foregoing to give a light colored, oil-soluble product softening at about 130° C.

*Example 5.*—The use of alkyl or aryl substituted phenol-carboxylic acids is illustrated by taking 100 parts of para cresotinic acid, 100 parts of formalin and 1 part of oxalic acid, refluxing the mixture for 12 hours, and dehydrating at 120° C. To 100 parts of the resin are added 400 parts of rosin and 55 parts glycerine and the mixture is heated at about 260° C. for approximately 6 hours or until the acid number is about 11. An amber colored product, softening at about 80° C. and readily soluble in oil is obtained.

*Example 6.*—In the treatment of a phenol-acid resin prepared as set out in Example 1 by reacting it with glycerine and a polybasic acid as phthalic anhydride, described in Example 1c, a controlled hardness of the resin is obtained; as an additional reactant, however, a monobasic resin acid or fatty acid or mixtures of them can be included to thereby promote oil solubility or impart to the product corresponding changes in its properties. For example, an acid resin is prepared from 100 parts of para-benzoic acid, 100 parts of formalin and 1 part of oxalic acid by refluxing them together for about 12 hours; to this is added 200 parts of rosin (abietic acid) which is further heated for about 2 hours, and the product is dehydrated at about 105° C.; the resulting product is further reacted with 40 parts of phthalic anhydride, 40 parts of linseed oil fatty acids and 25 parts of glycerine at a temperature of 180-200° C. until the acid number is reduced to 50 or less. Other fatty acids including tung oil fatty acids, sunflower fatty acids, etc. can be substituted for linseed oil acids; rosin or abietic acid can be substituted by other resins or resin acids or omitted entirely. A resinous product prepared in this manner from mixed acids shows, in addition to improved hardness over an alkyd resin prepared from a polybasic acid, improved resistance in the film to water and weak alkalies as well as solubility or compatibility with drying oils.

The preparation of varnishes or vehicles from the resins of this invention are illustrated in conjunction with some of the preceding examples. In general a resin content in the vehicle of as low as one per cent by weight imparts noticeable effects as to durability, gloss and hardness of the film; and this proportion can be increased to where the resin forms 50 per cent or more with corresponding improvements. Customarily, however, the proportions by weight used vary from about equal parts to one part of resin to about four parts of oil in accordance with established usage. Any of the usual metallic salts can be included as driers to speed the drying; for example from 0.1 to 0.2 gram of cobalt or 0.4 to 0.5 gram of lead calculated as metals can be added individually or together in the form of resinates, naphthenates or other salts to each gallon of varnish; manganese salts in the same proportion as cobalt can be substituted or made part of the drier mixture. As the resins are exceptionally pale in color and possess unusual hardness, with a melting point generally of about 135° C. to 165° C., they are particularly useful for wear-resistance in floor and linoleum varnishes, for rubbing furniture varnishes, and low temperature bake enamels; for these purposes the proportions are about 1 part of resin to 2 pats of dying oil.

The resins can be blended with other types of resins such as the oil-soluble phenolic resins in varying proportions. When a blend of about equal parts of an oil-soluble resin (such as one prepared from equimolecular proportions of a phenyl-phenol and formaldehyde) and an esterified resin as herein described is incorporated with a drying oil in amount to give a varnish of medium oil length (one part resin or resin blend to 3 parts oil), the varnish is found to be highly resistant and superior to a varnish made from either resin alone.

A varnish containing resins of this invention and a fatty or drying oil can be boiled or blown. In this form a linseed oil varnish is useful as a check in the cooking of tung oil varnish, for it imparts increased water and alkali resistance and an accelerated drying as compared to tung oil varnishes in which a linseed oil varnish without these resins is used as a checking or "chill back" oil.

I claim:

1. Process of preparing a resinous product which comprises reacting about equal parts of salicylic acid with formalin in the presence of an organic acid, dehydrating the acid resin so obtained, reacting the dehydrated resin with glycerine by heating to about 170° C. or higher and in amount to reduce the acid number of the resin to about 200 or less to thereby yield a resin that upon continued heating becomes infusible.

2. Process of preparing a resinous product which comprises forming an acid resin from a phenol-carboxylic acid and a methylene-containing agent, and forming a polyester from the resin so produced by reaction with an unsubstituted polyhydric alcohol.

3. Process according to claim 2 in which a part of the acid resin is substituted by an organic acid compound selected from the group consisting of resinic acids, fatty oil acids, polybasic carboxylic acids and their glycerides.

4. Process according to claim 2 in which the phenol-carboxylic acid is a hydroxy-benzoic acid.

5. Process according to claim 2 in which the unsubstituted polyhydric alcohol is glycerine.

6. Process of preparing a varnish composition which comprises forming an acid resin from a phenol-carboxylic acid and a methylene-containing agent, forming a polyester from the resin so produced by reaction with an unsubstituted polyhydric alcohol, adding a modifying agent for promoting oil-solubility, and mixing the resin with a drying oil.

7. Resinous product comprising the reaction product of an unsubstituted polyhydric alcohol with a resinous condensation product of a phenol-carboxylic acid and a methylene-containing agent.

8. Resinous product comprising the reaction product of glycerine with the resinous condensation product of a hydroxy-benzoic acid and formaldehyde.

9. Resinous product comprising the reaction product of an unsubstituted polyhydric alcohol with a resinous condensation product of a phenol-carboxylic acid and a methylene-containing agent, said product including a modifying agent for promoting oil-solubility and selected from the group consisting of resinic acids, fatty oil acids, polybasic carboxylic acids and their glycerides.

10. Varnish composition comprising a drying oil, a reaction product of an unsubstituted polyhydric alcohol with a resinous condensation product of a phenol-carboxylic acid and a methylene-containing agent, and a modifying agent for promoting solubility of the reaction product in the oil.

WILLIAM H. BUTLER.